United States Patent
Kim et al.

(10) Patent No.: US 7,929,924 B2
(45) Date of Patent: *Apr. 19, 2011

(54) MOBILE PHONE FOR CONTROLLING DIVERSITY

(75) Inventors: In Kwang Kim, Seoul (KR); Hong Woo Lee, Seongnam-si (KR)

(73) Assignees: Pantech Co. Ltd., Seoul (KR); SK Telecom Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/622,158

(22) Filed: Nov. 19, 2009

(65) Prior Publication Data

US 2010/0062815 A1    Mar. 11, 2010

Related U.S. Application Data

(63) Continuation of application No. 11/332,697, filed on Jan. 13, 2006, now Pat. No. 7,639,991.

(51) Int. Cl.
*H04B 7/02* (2006.01)

(52) U.S. Cl. ............... 455/101; 455/277.1; 455/277.2; 455/132; 455/134; 455/135; 375/347

(58) Field of Classification Search ............... 455/101, 455/277.1, 277.2, 132, 134, 135, 273; 375/347
See application file for complete search history.

(56) References Cited

U.S. PATENT DOCUMENTS

| 6,728,517 | B2 * | 4/2004 | Sugar et al. .......... 455/73 |
| 7,088,965 | B1 | 8/2006 | Ngan |
| 2004/0053526 | A1 | 3/2004 | Godfrey |
| 2005/0052245 | A1 | 3/2005 | Rofougaran |

FOREIGN PATENT DOCUMENTS

| KR | 1020010036597 | 5/2001 |
| KR | 1020030044745 | 6/2003 |
| KR | 1020060061019 | 6/2006 |

OTHER PUBLICATIONS

Ex-Parte Quayle Action dated Jan. 14, 2009 (for co-pending U.S. Appl. No. 11/332,697).
Notice of Allowance dated August 17, 2009 (for co-pending U.S. Appl. No. 11/332,697).

* cited by examiner

*Primary Examiner* — Sanh D Phu
(74) *Attorney, Agent, or Firm* — H.C. Park & Associates, PLC

(57) ABSTRACT

A mobile phone includes a controller; a receipt adjusting unit for controlling receipt of the (RF) radio frequency signal and controlling receipt diversity under control of the controller; a first RF signal receiver for converting the RF signal received through the first antenna into a baseband signal to be transmitted to the controller under control of the receipt adjusting unit; a second RF signal receiver for converting the RF signal received through the second antenna into a baseband signal to be transmitted to the controller under control of the receipt adjusting unit; a transmission diversity adjusting unit for controlling transmission diversity under control of the controller; and an RF signal transmitter for converting the baseband signal transmitted from the controller into an RF signal to be transmitted to the first antenna and transmitting the RF signal to the second antenna under control of the transmission diversity adjusting unit.

4 Claims, 3 Drawing Sheets

MOBILE PHONE FOR CONTROLLING DIVERSITY

CROSS-REFERENCE TO RELATED APPLICATION

This application is continuation of U.S. patent application Ser. No. 11/332,697, filed Jan. 13, 2006, which is hereby incorporated by reference for all purposes as if fully set forth herein.

BACKGROUND OF THE INVENTION

1. Field of the Invention

The present invention relates to a mobile phone for use in a radio communication system, and more particularly, to a mobile phone for selectively performing transmission/receipt diversity when radio frequency signals are transmitted and received.

2. Description of the Related Art

Communication between a mobile phone and a base station is well achieved in a is strong electric field which provides good communication environments. However, in a weak electric field which provides poor communication environments, the communication between the mobile phone and the base station is not well achieved due to weak intensity of signals, thus requiring higher power consumption for reliable transmission and receipt of the signals. This results in higher power consumption of a battery of the mobile phone as well as increase of a signal-to-noise ratio. To overcome such a problem, a diversity technique of receiving radio frequency signals via various propagation paths has been suggested. Hereinafter, configuration of a conventional mobile phone to which the above-mentioned diversity technique is applied will be described with reference to FIG. 1.

Referring to FIG. 1, the conventional mobile phone includes an antenna 110 for transmitting and receiving radio frequency signals, a duplexer 120 coupled to the antenna 110 for transmitting/receiving the radio frequency signals to/from the antenna 110, a low noise amplifier 131 for amplifying intensity of the radio frequency signals received via the duplexer 120, a filter 132 for filtering the radio frequency signals amplified by the low noise amplifier 131 to remove noises from the radio frequency signals, a first receiving signal processor 133 for demodulating the radio frequency signals filtered by the filter 132 and converting the demodulated radio frequency signals into baseband signals to be output to a controller 140, a transmitting signal processor 151 for modulating the baseband signals transmitted from the controller 140 and converting the modulated baseband signals into radio frequency signals, a filter 152 for filtering the radio frequency signals output from the transmitting signal processor 151 to remove noises from the radio frequency signals, a power amplifier 153 for amplifying power of the radio frequency signals filtered by the filter 152, and a transmission/receipt isolator 154 for preventing a receiving signal received via the antenna 110 from being transmitted to the transmitting signal is processor 151, and transmitting the radio frequency signal amplified by the power amplifier 153 to the duplexer 120.

In addition, the conventional mobile phone further includes an antenna 160 for receiving radio frequency signals, a band-pass filter 171 for filtering the radio frequency signals received from the antenna 160 to pass only radio frequency signals of a receipt band, a low noise amplifier 172 for amplifying intensity of the radio frequency signals filtered by the band-pass filter 171, a filter for filtering the radio frequency signals amplified by the low noise amplifier 172 to remove noises from the radio frequency signals, and a second receiving signal processor 174 for demodulating the radio frequency signals filtered by the filter 173 and converting the demodulated radio frequency signals into baseband signals to be output to the controller 140.

However, since the conventional mobile phone as configured above performs only receiving diversity, but does not perform transmission diversity, a base station can not correctly receive signals transmitted from the mobile phone in an area of poor communication environments, which may result in deterioration of quality of communication services provided to users of mobile phones. Particularly, since the conventional mobile phone can not control the receipt diversity according to ambient communication environments, and thus, must perform the receipt diversity even in the strong electric fields, wasteful power consumption of a battery of the mobile phone is unavoidable.

SUMMARY OF THE INVENTION

The exemplary embodiments of the present invention provide a mobile phone for selectively performing transmission/receipt diversity when radio frequency signals are transmitted and received.

The exemplary embodiments of the present invention also provide a mobile phone for reducing the risk of reduced transmission quality due to a fading effect, which may be caused by buildings or terrestrial features located on propagation paths by controlling transmission/receipt diversity at a user's disposal according to ambient communication environments.

The exemplary embodiments of the present invention also provide a mobile phone for reducing the risk of wasting power of a battery of the mobile phone due to diversity in a strong electric field by controlling transmission/receipt diversity to be performed only in an area of poor communication environments.

Exemplary embodiments of the present invention disclose a mobile phone to receive power from a battery and to transmit and receive a radio frequency signal through a first antenna and a second antenna in a radio communication system. The mobile phone includes a controller to control transmission/receipt of the radio frequency signal and to control s transmission/receipt diversity; a receipt adjusting unit to control receipt of the radio frequency signal and to control receipt diversity under control of the controller; a first radio frequency signal receiver to convert the radio frequency signal received through the first antenna into a baseband signal to be transmitted to the controller under receipt control of the receipt adjusting unit; a second radio frequency signal receiver to convert the radio frequency signal received through the second antenna into a baseband signal to be transmitted to the controller under receipt diversity control of the receipt adjusting unit; a transmission diversity adjusting unit to control transmission diversity under control of the controller; and radio frequency signal transmitter to convert the baseband signal transmitted from the controller into a radio frequency signal to be transmitted to the first antenna and to transmit the radio frequency signal to the is second antenna under transmission diversity control of the transmission diversity adjusting unit.

BRIEF DESCRIPTION OF THE DRAWINGS

The above and/or other objects and advantages of the present invention will become apparent and more readily appreciated from the following description of the embodiments, taken in conjunction with the accompanying drawings of which.

DETAILED DESCRIPTION OF THE EXEMPLARY EMBODIMENTS

Hereinafter, exemplary embodiments of the present invention will be described in detail with reference to the accompanying drawings.

Figure 1:
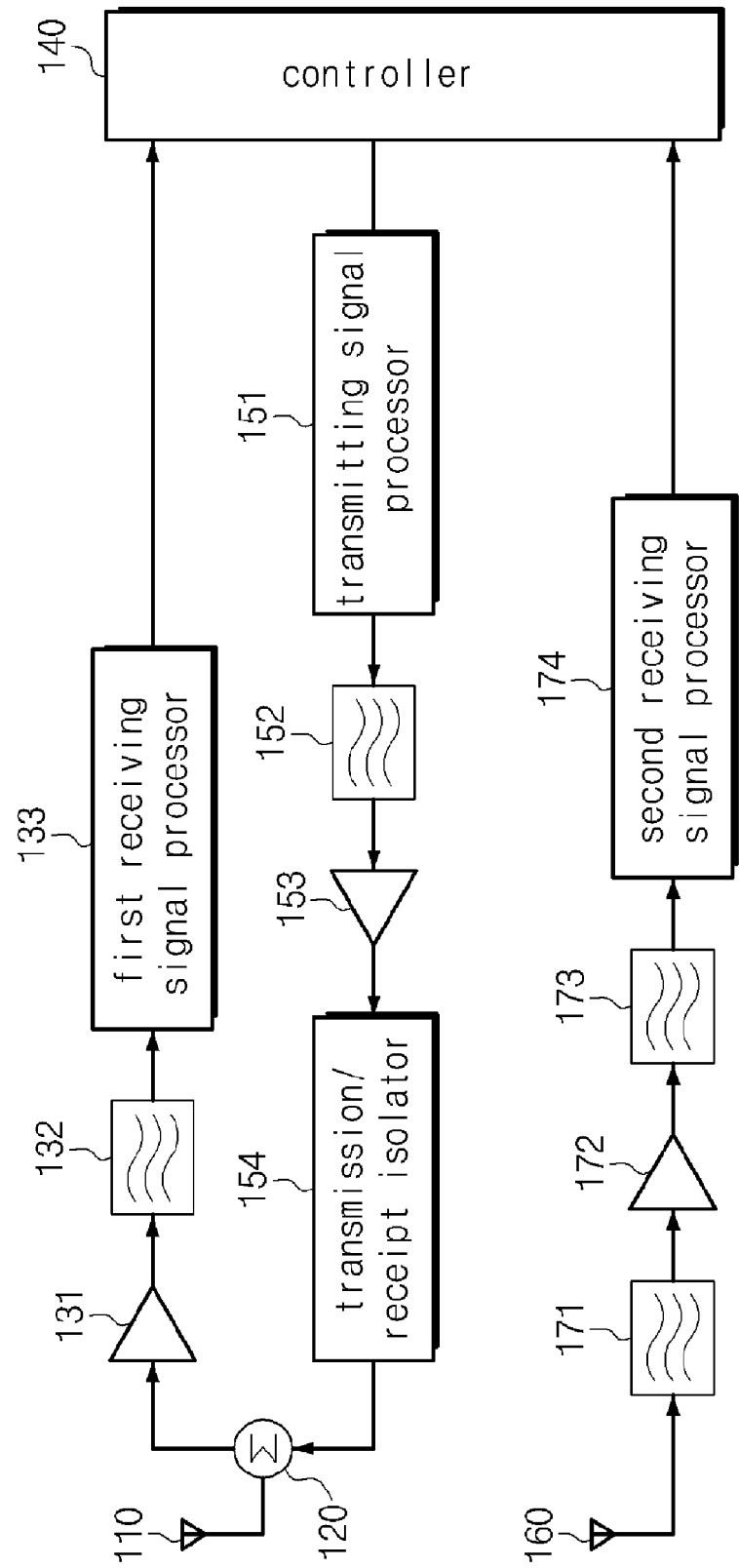
FIG. 1 is a circuit diagram showing configuration of a conventional mobile phone.
Figure 2:
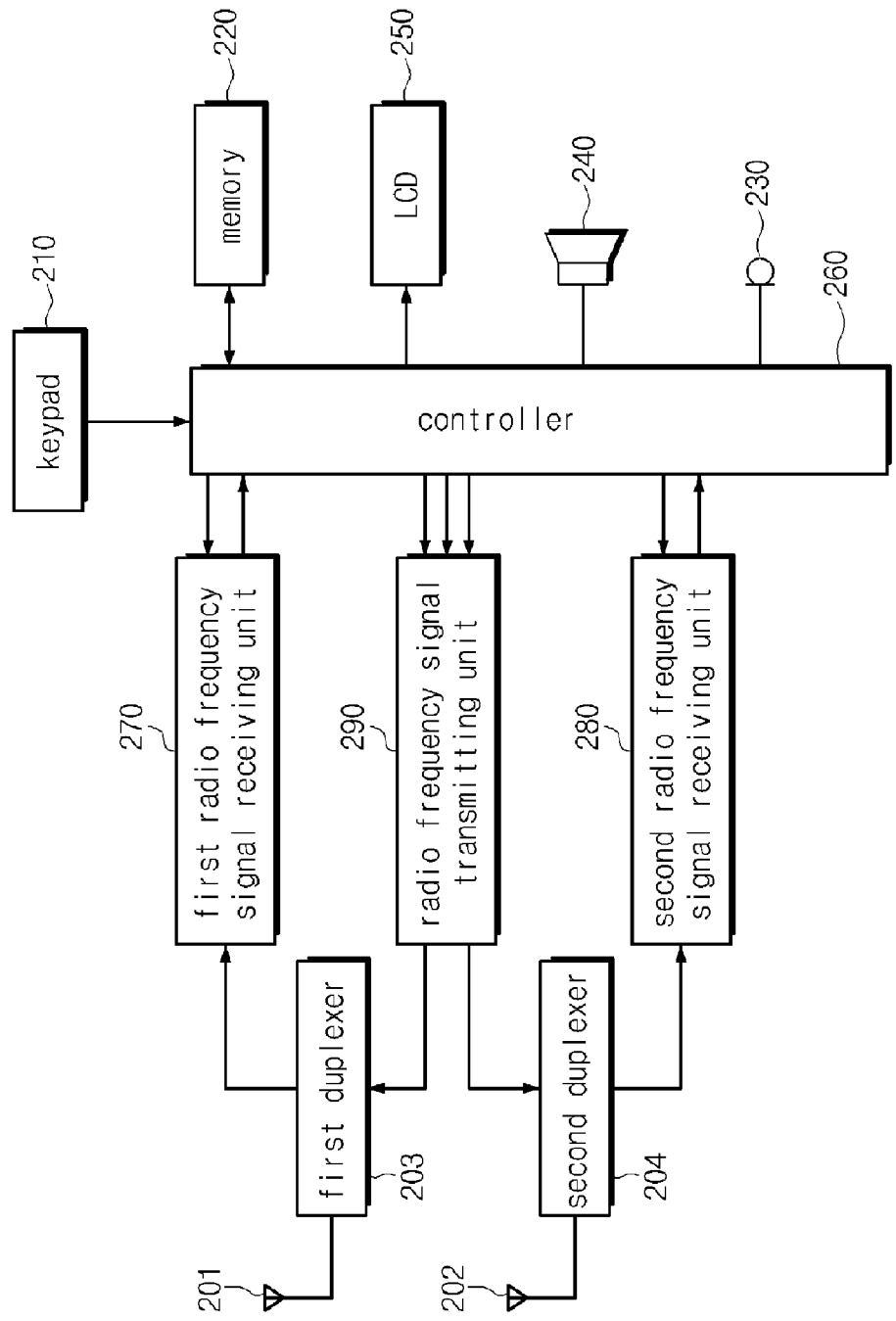
FIG. 2 is a block diagram showing configuration of a mobile phone for control of diversity according to an embodiment of the present invention.

FIG. 2 is a block diagram showing configuration of a mobile phone for control of diversity according to an embodiment of the present invention.

Referring to FIG. 2, a mobile phone includes a keypad 210 for inputting user instructions and characters related to communication services and various additional services, a memory 220 for storing characters, image information and so on, a microphone 230 for inputting user voice signals and various sound signals, a speaker 240 for outputting the voice and sound signals, a liquid crystal display (LCD) 250 for displaying characters and images, and a controller 260 for controlling transmission of the voice and sound signals input through the microphone 230, reading/writing the characters and images from/into the memory, output of the voice and sound signals through the speaker 240, display of the characters and images on the LCD 250, and transmission/receipt and diversity of radio frequency signals, according to user instructions input through the keypad 210.

In addition, the mobile phone further includes first and second antennas 201 and 202 for transmitting and receiving radio frequency signals, a first radio frequency signal receiving unit 270 for converting the radio frequency signals received from the first antenna 201 into baseband signals to be transmitted to the controller 260 under control of the controller 260, a second radio frequency signal receiving unit 280 for converting the radio frequency signals received from the second antenna 202 into baseband signals to be transmitted to the controller 260 under control of the controller 260, a radio frequency signal transmitting unit 290 for converting the baseband signals transmitted from the controller 260 into radio frequency signals, distributing the radio frequency signals, and selectively outputting the distributed radio frequency signals to the first and second antennas 201 and 202, under control of the controller 260, a first duplexer 203 for transmitting the radio frequency signals received through the first antenna 201 to the first radio frequency signal receiving unit 270 and transmitting the radio frequency signals output from the radio frequency signal transmitting unit 290 through the first antenna 201, and a second duplexer 204 for transmitting the radio frequency signals received through the second antenna 201 to the second radio frequency signal receiving unit 280 and transmitting the radio frequency signals output from the radio frequency signal transmitting unit 290 through the second antenna 202.

Now, circuit configuration for signal transmission and receipt of the mobile phone as configured above will be described with reference to FIG. 3.

Figure 3:
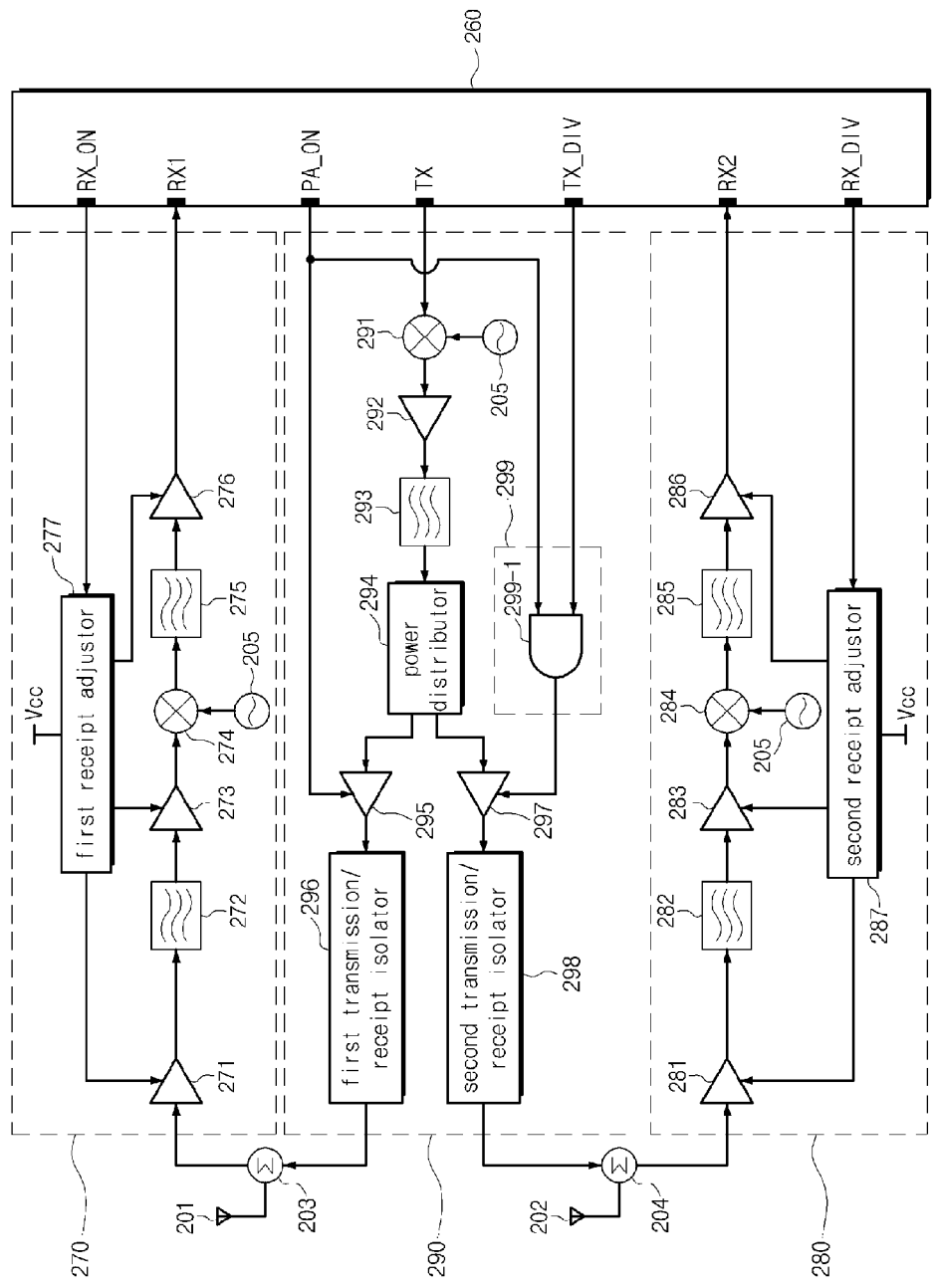
FIG. 3 is a circuit diagram showing configuration of a mobile phone for control of diversity according to an embodiment of the present invention.

Referring to FIG. 3, the first radio frequency signal receiving unit 270 includes a low noise amplifier 271 having an input terminal connected to the first duplexer 203, a filter 272 having an input terminal connected to an output terminal of the low noise amplifier 271, an amplifier 273 having an input terminal connected to an output terminal of the filter 272, a local oscillator 205 for oscillating microwave signals, a mixer 274 having two input terminals connected to an output terminal of the amplifier 273 and an output terminal of the local oscillator 205, respectively, a low-pass filter 275 having an input terminal connected to an output terminal of the mixer 274, an amplifier 276 having an input terminal connected to the low-pass filter 275 and an output terminal connected to a receiving terminal RX1 of the controller 260, and a first receipt adjustor 277 having an input terminal connected to a receipt control terminal RX_ON of the controller 260, a power terminal connected to a power source VCC of a battery (not shown), and an output terminal connected to power terminals of the amplifiers 271, 273 and 276.

The first receipt adjustor 277 receives the power source VCC of the battery and controls driving of the amplifiers 271, 273 and 276. More specifically, when the controller 260 outputs a control signal to instruct receipt of a signal through the receipt control terminal RX_ON, the first receipt adjustor 277 applies the power source VCC supplied from the battery to the power terminals of the amplifiers 271, 273 and 276 to drive (turn on) the amplifiers 271, 273 and 276. The driven amplifier 271 amplifies the radio frequency signal received from the first duplexer 203 and transmits the amplified radio frequency signal to the filter 272, the driven amplifier 273 amplifies an output signal of the filter 272 and transmits the amplified output signal to the mixer 274, and the driven amplifier 276 amplifies an output signal of the low-pass filter 275 and transmits the amplified output signal to the receiving terminal RX1 of the controller 260.

At this time, the first receipt adjustor 277 receives the power source VCC, 4.2 V, of the battery and outputs a voltage of about 2.9 V as a driving power source of the amplifiers 271, 273 and 276.

If the controller 260 outputs a control signal to instruct receipt stop of a signal through the receipt control terminal RX_ON, the first receipt adjustor 277 outputs a voltage of 0V to the power terminals of the amplifiers 271, 273 and 276 to turn off the amplifiers 271, 273 and 276. Like this, when the amplifiers 271, 273 and 276 are turned off, since the amplifier 271 does not transmit the radio frequency signal received through the first duplexer 203 to the filter 272, the controller 260 does not receive the radio frequency signal from the first antenna 201.

The second radio frequency signal receiving unit 280 includes a low noise amplifier 281 having an input terminal connected to the second duplexer 204, a filter 282 having an input terminal connected to an output terminal of the low noise amplifier 281, an amplifier 283 having an input terminal connected to an output terminal of the filter 282, a local oscillator 205 for oscillating microwave signals, a mixer 284 having two input terminals connected to an output terminal of the amplifier 283 and an output terminal of the local oscillator 205, respectively, a low-pass filter 285 having an input terminal connected to an output terminal of the mixer 284, an amplifier 286 having an input terminal connected to the low-pass filter 285 and an output terminal connected to a receiving terminal RX2 of the controller 260, and a second receipt adjustor 287 having an input terminal connected to a receipt diversity control terminal RX_DIV of the controller 260, a power terminal connected to the power source VCC of the battery, and an output terminal connected to power terminals of the amplifiers 281, 283 and 286.

The low noise amplifiers 271 and 281 amplify the radio frequency signals received through the first and second duplexers 203 and 204, respectively, improving a signal-to-is noise ratio (SNR).

The filters 272 and 282 remove signal noises produced in the course of amplification of the low noise amplifiers 271 and 281, respectively.

The amplifiers 273 and 283 amplify the radio frequency signals passing through the filters 272 and 282 in order to increase intensity of the radio frequency signals weakened while the radio frequency signals pass through the filters 272 and 282.

The mixers 274 and 284 mix the radio frequency signals amplified by the amplifiers 273 and 283 with the microwave signals oscillated from the local oscillator 205 to generate baseband signals. That is, the mixers 274 and 284 serve to convert radio frequency signals received from the outside into baseband signals adapted to the controller 260.

The low-pass filters 275 and 285 pass only the baseband signals of the output signals of the mixers 274 and 284. This is to remove out-of-band signals of the baseband signals of the output signals of the mixers 274 and 284.

The amplifiers 276 and 286 amplify the baseband signals filtered by the low-pass filters 275 and 285 and transmit the amplified baseband signals to the controller 260. This is to provide baseband signals having intensity enough to be detected by the controller 260 to the controller 260.

The second receipt adjustor 287 receives the power source VCC of the battery and controls driving of the amplifiers 281, 283 and 286. More specifically, when the controller 260 outputs a control signal to instruct receipt diversity through the receipt diversity control terminal RX_DIV, the second receipt adjustor 287 applies the power source VCC supplied from the battery to the power terminals of the amplifiers 281, 283 and 286 to drive (turn on) the amplifiers 281, 283 and 286. The driven amplifier 281 amplifies the radio frequency signal received from is the second duplexer 204 and transmits the amplified radio frequency signal to the filter 282, the driven amplifier 283 amplifies an output signal of the filter 282 and transmits the amplified output signal to the mixer 284, and the driven amplifier 286 amplifies an output signal of the low-pass filter 285 and transmits the amplified output signal to the receiving terminal RX2 of the controller 260. Here, the second receipt adjustor 287 receives the power source VCC, 4.2 V, of the battery and outputs a voltage of about 2.9 V as a driving power source of the amplifiers 281, 283 and 286.

If the controller 260 outputs a control signal to instruct receipt diversity stop through the receipt diversity control terminal RX_DIV, the second receipt adjustor 287 outputs a voltage of 0 V to the power terminals of the amplifiers 281, 283 and 286 to turn off the amplifiers 281, 283 and 286. Like this, when the amplifiers 281, 283 and 286 are turned off, since the amplifier 281 does not transmit the radio frequency signal received through the second duplexer 204 to the filter 282, the controller 260 does not receive the radio frequency signal from s the second antenna 202.

The radio frequency signal transmitting unit 290 includes a local oscillator 205 for oscillating a microwave signal, a mixer 291 having two input terminals connected to a transmission terminal TX of the controller 260 and an output terminal of the local oscillator 205, respectively, an amplifier 292 having an input terminal connected to an output terminal of the mixer 291, a filter 293 having an input terminal connected to an output terminal of the amplifier 292, a power distributor 294 having an input terminal connected to an output terminal of the filter 293, a first power amplifier 295 having an input terminal connected to one of output terminals of the power distributor 294 and a power terminal connected to a transmission control terminal PA_ON of the controller 260, a first transmission/receipt isolator 296 having an input is terminal connected to an output terminal of the first power amplifier 295 and an output terminal connected to the first duplexer 203, a second power amplifier 297 having an input terminal connected to the other of output terminals of the power distributor 294, and a second transmission/receipt isolator 298 having an input terminal connected to an output terminal of the second power amplifier 297 and an output terminal connected to the second duplexer 204.

In addition, the radio frequency signal transmitting unit 290 further includes a transmission diversity adjustor 299 for controlling transmission diversity under control of the controller 260.

The mixer 291 mixes the baseband signal output from the controller 260 with the microwave signal oscillated from the local oscillator 205 to generate a radio frequency signal. That is, the mixer 291 serves to convert a signal to be transmitted from the controller 260 into a signal of a radio frequency band adapted to the outside.

The amplifier 292 amplifies the radio frequency signals generated in the mixer 291.

The filter 293 removes noises produced in the course of amplification of the amplifier 292.

The power distributor 294 distributes the radio frequency signal passing through the filter for transmission diversity and outputs the distributed radio frequency signals to the first and second power amplifiers 295 and 297.

The first and second power amplifiers 295 and 297 amplify intensity of the radio frequency signals weakened while the radio frequency signals pass through the filter 293 and the power distributor 294 such that the radio frequency signals have power enough to be transmitted to the outside. In addition, the first power amplifier 295 is controlled by a transmission control is signal output from the transmission control terminal PA_ON of the controller 260.

The first and second transmission/receipt isolators 296 and 298 transmit the radio frequency signals amplified by the first and second power amplifiers 295 and 297 to the first and second duplexers 203 and 204, respectively, and prevent the radio frequency signals received through the first and second duplexers 203 and 204 from being received in the radio frequency transmitting unit 290.

The transmission diversity adjustor 299 comprises an AND gate 299-1 having two input terminals connected to the transmission control terminal PA_ON and the transmission diversity control terminal TX_DIV of the controller 260, respectively, and an output terminal connected to a power terminal of the second power amplifier 297.

More specifically, the AND gate 299-1 outputs a high level signal "1" to the power terminal of the second power amplifier 297 only when a high level signal "1" is input to the two input terminals, and outputs a low level signal "0" to the power terminal of the second power amplifier 297 when a low level signal "0" is input to any one of the two input terminals, that is, when a high level signal "1" is input to one of the two input terminals and a low level signal "0" is input to the other. Accordingly, the second power amplifier 297 is controlled by an output signal of the transmission diversity adjustor 299. For example, when a high level signal "1" is output from the AND gate 299-1, the second power amplifier 297 is turned on so that the radio frequency signal distributed by the power distributor 294 is output to the second transmission/receipt isolator 298. On the other hand, when a low level signal "0" is output from the AND gate 299-1, the second power amplifier 297 is turned off so that the radio frequency signal distributed by the power distributor 294 is prevented from being transmitted to the second antenna 202.

So far, it has been shown and described in this embodiment that the first and second radio frequency signal receiving units 270 and 280 convert the received radio frequency signals into the baseband signals without passing through an intermediate frequency converting process, and, likewise, the radio frequency signal transmitting unit 290 also converts the baseband signal output from the controller 260 into the radio frequency signal without passing through an intermediate frequency converting process. However, this embodiment is merely provided according to a trend of recent techniques, and the present invention is not limited to such configuration.

That is, the first and second radio frequency signal receiving units 270 and 280 may first convert the received radio frequency signals into intermediate frequency signals and then convert the intermediate frequency signals into the baseband signals, and, likewise, the radio frequency signal transmitting unit 290 also may first convert the baseband signal output from the controller 260 into an intermediate frequency signal and then convert the intermediate s frequency signal into the radio frequency signal. Since such a frequency converting scheme is well-known in the art, detailed explanation thereof will be omitted for the purpose of brevity.

Hereinafter, operation of the mobile phone as configured above will be described.

First, under a communication state without any instructions from a user, the controller 260 always outputs a control signal to instruct receipt of a signal to the first receipt adjustor 277 through the receipt control terminal RX_ON. Thus, the first receipt adjustor 277 applies the power source VCC supplied from the battery to drive (turn on) the amplifiers 271, 273 and 276, as described above. When the amplifiers 271, 273 and 276 are driven so, the radio frequency signal received through the first antenna 201 is transmitted to the controller 260 via the first radio frequency signal receiving unit 270. At this time, the radio frequency signal is converted into the baseband signal through the above-described processes, and then, the baseband signal is input into the receiving terminal RX1 of the controller 260.

In addition, when the user inputs instructions to perform receipt diversity using keys on the keypad 210, the controller 260 sets a receipt diversity mode and outputs a control signal to instruct receipt diversity to the second receipt adjustor 287 through the receipt diversity control terminal RX_DIV. At this time, as described above, the second receipt adjustor 287 applies the power source VCC supplied from the battery to the amplifiers 281, 283 and 286 to drive (turn on) the amplifiers 281, 283 and 286. When the amplifiers 281, 283 and 286 are driven so, the second radio frequency signal receiving unit 280 performs the receipt diversity.

In a state of such receipt diversity, as described above, the radio frequency signal received through the second antenna 204 is converted into the baseband signal by the second radio frequency signal receiving unit 280, and then, the baseband signal is input into the receiving terminal RX2 of the controller 260.

At this time, the controller can select a good signal of signals received via two propagation paths or both of the received signals. In this case, a signal processing scheme depends on a preset execution program.

If the received signals are a character and/or image signal, the controller 260 displays received characters and/or images on the LCD 250 or stores them in the memory 220 according to user instructions input through the keypad 210. If the received signal is a voice signal, the controller 260 outputs the received voice signal to the outside through the speaker 240.

In addition, when the controller 260 transmits a character signal input through the keypad 210 or a voice signal input through the microphone 230 according to user instructions, is the controller 260 converts the character or voice signal into a baseband signal and transmits the baseband signal to the radio frequency signal transmitting unit 290.

Then, the radio frequency signal transmitting unit 290 converts the baseband signal into a radio frequency signal through the mixer 291. This radio frequency signal is distributed through the power distributor 294, and then, is transmitted to the first and second power amplifiers 295 and 297. At this time, when the second power amplifier 297 is turned off, the baseband signal output from the power distributor 294 is amplified by the first power amplifier 295, and then, is transmitted to the first antenna 201.

Even in the case of interception of the transmission diversity, since the controller 260 always outputs a control signal to instruct signal transmission, i.e., a high level signal "1", to the power terminal of the first power amplifier 295 through the transmission control terminal PA_ON to turn on the first power amplifier 295 under a communication state without any user instructions, the radio frequency signal converted by the mixer 291 can be transmitted to the s outside through the first antenna 201.

If the user inputs instructions to perform transmission diversity using keys on the keypad 210, the controller 260 sets a transmission diversity mode, outputs a control signal to instruct transmission diversity, i.e., a high level signal "1", to the transmission diversity adjustor 299 through the transmission diversity control terminal TX_DIV, and always outputs the high level signal "1" to the transmission diversity adjustor 299 through the transmission control terminal PA_ON, as described above. Accordingly, the transmission diversity adjustor 299 turns on the second power amplifier 297 through the above-described processes.

When the second power amplifier 297 is turned on so, the radio frequency signal distributed by the power distributor 294 is transmitted through the first and second antennas 201 is and 202 at once.

On the other hand, when the user does not input instructions to stop the transmission diversity or does not instruct the transmission diversity, since the controller 260 outputs a low level signal "0" to the transmission diversity adjustor 299 through the transmission diversity control terminal TX_DIV, the transmission diversity adjustor 299 turns on or off the second power amplifier 297, as described above.

As described above, by allowing a user to control the transmission/receipt diversity using keys at a user's disposal in such a manner that a mobile phone performs diversity only in a weak electric field condition where transmission of electromagnetic waves are hindered due to ambient buildings or terrestrial features and does not perform diversity in a strong electric field providing good communication environments, it may be possible to prevent power of a battery of the mobile phone from being wastefully dissipated and provide good communication services.

As apparent from the description, communication services can be provided to both of a transmitting party and a receiving party by controlling transmission/receiving diversity at a user's disposal according to ambient communication environments, which may result in higher reliability of users for mobile communication services.

The exemplary embodiment of the present invention have been shown and described only for illustration, not limitation. It will be appreciated by those skilled in the art that changes may be made in these embodiments without departing from the principles and spirit of the invention, the scope of which is defined in the appended claims and their equivalents.

What is claimed is:

1. A mobile phone to transmit and receive a radio frequency signal through a first antenna and a second antenna in a radio communication system, comprising:
   a first radio frequency signal receiving unit to convert the radio frequency signal received through the first antenna into a baseband signal to be transmitted to a controller;
   a second radio frequency signal receiving unit to convert the radio frequency signal received through the second antenna into a baseband signal to be transmitted to the controller; and
   a radio frequency signal transmitting unit to convert a baseband signal transmitted from the controller into a radio frequency signal to be transmitted to the first antenna or second antenna under control of the controller,
   wherein the controller controls transmission/receipt of the radio frequency signal, and controls transmission/receipt diversity through selecting the first radio frequency signal receiving unit or the second radio frequency signal receiving unit to control receipt diversity, and selecting the first antenna or the second antenna to control the transmission diversity through the radio frequency signal transmitting unit.

2. The mobile phone according to claim 1, wherein the first radio frequency signal receiving unit and the second radio frequency signal receiving unit comprise:
   a receipt adjusting unit to control receipt of the radio frequency signal and to control receipt diversity under control of the controller.

3. The mobile phone according to claim 2, wherein the receipt adjusting unit comprises:
   a first receipt adjustor to receive power supplied from a battery, and to supply driving power to the first radio frequency signal receiving unit under control of the controller; and
   a second receipt adjustor to receive power supplied from the battery, and to supply driving power to the second radio frequency signal receiving unit under control of the controller.

4. The mobile phone according to claim 1, wherein the radio frequency signal transmitting unit comprises:
   a power distributor to distribute the radio frequency signal output;
   a first power amplifier to amplify the radio frequency signal distributed by the power distributor, and to output the amplified radio frequency signal to the first antenna under control of the controller; and
   a second power amplifier to amplify the radio frequency signal distributed by the power distributor, and to output the amplified radio frequency signal to the second antenna under control of the controller.

* * * * *